Figure 2:
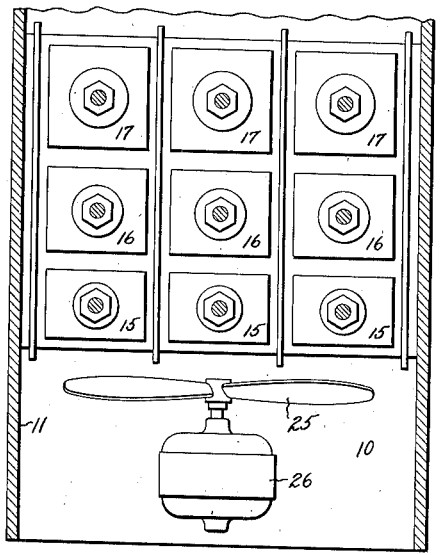

May 31, 1938.    R. T. CHEESEMAN ET AL    2,119,381
HIGH POWER DRY DISK RECTIFIER
Filed Sept. 19, 1936

Inventors:
Ralph T. Cheeseman,
Edgar A. Harty,
by Harry E. Dunham
Their Attorney.

Patented May 31, 1938

2,119,381

UNITED STATES PATENT OFFICE 2,119,381

HIGH POWER DRY DISK RECTIFIER

Ralph T. Cheeseman, Lynn, and Edgar A. Harty, Marblehead, Mass., assignors to General Electric Company, a corporation of New York Application September 19, 1936, Serial No. 101,640

3 Claims. (Cl. 175—366)

Our invention relates to current rectifying apparatus of the dry disk type designed to supply direct current from alternating current lines for the operation of devices, such as motion picture arc lamps, requiring relatively high power. The principal object of the invention is the provision of an improved cooling arrangement for the rectifier apparatus whereby relatively high current outputs for the arc lamps of high power motion picture projectors, or for other uses requiring such large current outputs, are obtained from a rectifier apparatus of the dry disk type which is more compact and of lower cost than are dry rectifier apparatus heretofore available for the above-mentioned uses.

To supply the high current output required in present motion picture theaters in which projectors of the high intensity type are employed, dry disk rectifier apparatus has been provided heretofore incorporating a special arrangement of rectifier units associated with a forced draft air cooling means, such as shown, for example, in United States Patent No. 1,947,240, wherein blowers cause cool air to flow over the rectifier active elements and in contact with radiating fins associated with these elements. In the rectifier apparatus shown in the above-mentioned patent, the rectifier elements which require cooling are arranged side by side in the same plane to form a single-layer rectifier bank or assembly through which flows the current of cooling air. In this prior apparatus, the current of cooling air is therefore caused to come into contact with and to absorb heat losses from only one layer or stage of rectifier active elements and heat radiating fins.

In certain other prior rectifier apparatus of the dry disk type for the supply of relatively high direct current power and incorporating forced-draft air-cooling means, the air is caused to flow over a number of rectifier stacks in succession, but the arrangement is such that in so doing the air becomes heated by reason of the absorption of heat losses from the first stacks encountered and is therefore less efficient in absorbing heat losses from the succeeding stacks, with consequent tendency of the latter stacks to become overheated and damaged.

In accordance with our present invention, a relatively high current output is obtained from a dry disk rectifier apparatus by mounting a series of parallelly arranged banks or stages of rectifier active elements and their associated radiating fins in a current of cooling medium, preferably air, and by compensating for the consequent progressive increase in temperature of the cooling medium by so forming the radiating fins that the area of the fins corresponding to succeeding banks of the series is increased progressively.

Our invention will be better understood from the following description when considered in connection with the accompanying drawing, and its scope will be pointed out in the appended claims.

Figure 1:
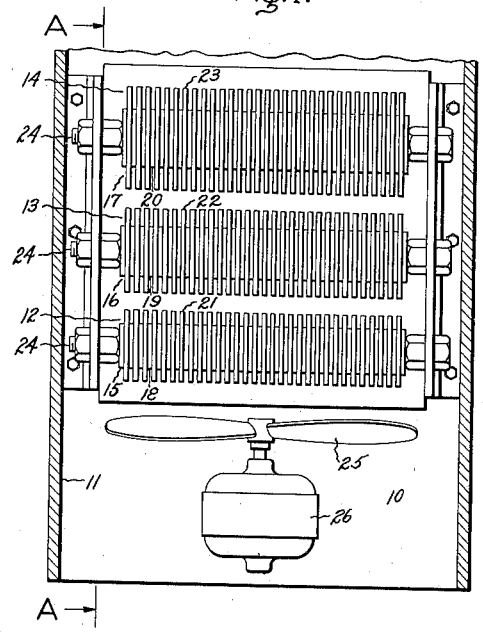
Figure 3:
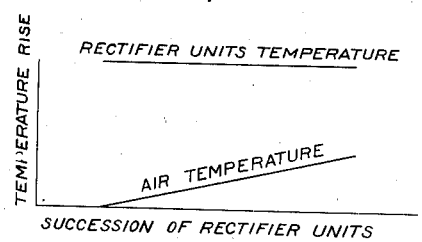

Referring to the drawing, Fig. 1 is a side elevational view, partially in section, of a rectifier apparatus in which our invention has been embodied; Fig. 2 is a sectional view on line A—A of Fig. 1; and Fig. 3 shows curves illustrating the operation of the embodiment of our invention shown in Figs. 1 and 2.

In Figs. 1 and 2, the numeral 10 designates a rectifier unit comprising a casing 11 in which are mounted a plurality of rectifier banks or stages 12, 13, 14, comprising respectively the adjacently disposed sets of rectifier stacks 15, 16 and 17 assembled in the usual manner by clamping a plurality of rectifier active elements 18, 19 or 20 and their associated heat radiating fins 21, 22 or 23 on bolts or rods 24. The stacks 15, 16, 17 of the corresponding banks 12, 13, 14 are preferably mounted in substantially the same plane, and the banks of stacks are preferably arranged with their planes parallel, thus forming a series of banks of rectifier stacks. To provide means for causing a current of cooling air to flow through casing 11 and in contact with the active elements and radiating fins of the banks of rectifier stacks 12 to 14, a propeller or fan 25 actuated by a motor 26 is mounted in the casing, preferably at one end of the series of banks. The fan is preferably so arranged that air is drawn in at the bottom of the casing 11 and is forced through the banks 12, 13 and 14 in series, and out of the casing through suitable openings formed therein.

With the arrangement of rectifier banks and fan so far described herein, the cooling air from fan 25 first comes in contact with the bank 12 constituted by rectifier stacks 15 having radiating fins 21 of suitable area for transferring the heat losses of the latter stacks to the cooling air. The air which has thus been raised in temperature by absorbing the heat losses in stacks 15 now passes through the next bank 13 of the series of banks, absorbing heat from the stacks 16, thereby being raised still higher in temperature, and thence passes through the final bank 14 of the series to absorb the heat losses from the stacks 17. Therefore, the first bank 12 of the series is efficiently cooled, assuming, as in usual practice, that the stacks 15 constituting this bank are provided with fins 21 of suitable area, considering the ambient temperature and the volume and velocity of air supplied by the fan 25. But since the temperature of the air current coming in contact with the succeeding banks 13 and 14 of the series is progressively raised because of the absorption of heat from banks 12 and 13, inadequate cooling of banks 13 and 14 results unless a means is provided to insure sufficiently rapid transfer of the heat losses, in these latter two banks of the series, to the progressively heated current of cooling air.

In accordance with our present invention, this difficulty is overcome by forming the radiating fins 22 of the second bank 13 of greater area than the fins 21 of the first bank 12, and correspondingly forming the fins 23 of the third bank 14 of greater area than those of the second bank. The effect of thus providing fins of progressively increasing area throughout the series of banks 12 to 14 is illustrated by the curves of Fig. 3 wherein, as the cooling air passes through the banks of rectifier units in succession, the air temperature rises correspondingly, but, since the air temperature rise is compensated for by the progressively increased radiating surface, the temperature of the rectifier units remains substantially constant. Thus, in a single apparatus casing in which may be mounted a single fan or similar means for causing a flow of cooling air, a marked increase in the number of rectifier units in the apparatus and thereby a corresponding marked increase in capacity of the apparatus are made possible without a proportionate increase in the size and cost of the apparatus.

The arrangement of rectifier units and means for causing a flow of air in series through the units in accordance with our invention may be such that the air is either forced through the units, as illustrated in Figs. 1 and 2, or is drawn through the units, or the fan or other means for producing the flow of air may be located between certain of the rectifier units. Further, in some applications of the invention, a fan or similar means for causing flow of air or other cooling medium through the rectifier units in series may be replaced by a natural circulation means.

In the embodiment of the invention herein illustrated, the banks or stages of rectifier units or stacks are disposed vertically and above the fan 25. Any other suitable arrangement may be employed, however, whereby cooling air is caused to flow uniformly through a plurality of serially disposed rectifier banks having radiating fins of progressively increasing area. Further, instead of air, other cooling mediums such as oil may be employed, the medium being circulated through the rectifier units in series, either by natural circulation means or by means providing a forced circulation.

Our invention has been described herein in a particular embodiment for purposes of illustration. It is to be understood, however, that the invention is susceptible of various changes and modifications, and that by the appended claims we intend to cover any such modifications as fall within the true spirit and scope of our invention.

What we claim as new and desire to secure by Letters Patent of the United States, is:

1. A rectifier unit including a plurality of rectifier stacks of the dry disk type, each of said stacks including a plurality of active elements and heat radiating fins, and means to cause a current of cooling medium to flow through said unit in contact with said active elements and said fins, said stacks being so arranged relatively to each other that said cooling medium flows over said stacks in series, the fins of the stacks to which said current is first supplied being of a predetermined area to cause said medium to absorb the heat losses of said first stacks, the fins of the succeeding stacks being of progressively larger area than said predetermined fin area, whereby to cause said medium to absorb sufficient of the heat losses of said succeeding stacks to maintain said stacks at substantially the temperature of the first stacks to which said medium is supplied notwithstanding the higher temperature of said medium.

2. A rectifier unit including a plurality of banks of rectifier stacks of the dry disk type, the stacks of each bank being mounted side by side in substantially the same plane and each including a plurality of active elements and heat radiating fins, said banks being arranged parallel to each other, and means to cause a current of cooling medium to flow through said banks in series, the fins of the series of banks being of progressively larger area as the distance traveled by said current through said series of banks increases.

3. A rectifier unit comprising a casing, a plurality of banks of rectifier stacks mounted therein, each of said stacks comprising a plurality of active elements and heat radiating fins, and means to cause a current of cooling medium to flow through said casing, said banks being arranged in series with respect to said current whereby the temperature of said medium increases progressively as said medium comes in contact with succeeding banks of said series, the fins corresponding to succeeding banks of said series being increased in area progressively to compensate for said temperature rise of said medium.

RALPH T. CHEESEMAN.
EDGAR A. HARTY.